United States Patent
Ferre et al.

(10) Patent No.: US 9,294,357 B2
(45) Date of Patent: *Mar. 22, 2016

(54) OPTIMIZING RESOURCE USAGE IN SYSTEMS WHICH INCLUDE HETEROGENEOUS DEVICES, INCLUDING SENSORS AND SMARTPHONES

(71) Applicant: International Business Machines Corporation, Armonk, NY (US)

(72) Inventors: Wilfredo Ferre, Le Mesnil le Roi (FR); Michael S. Gordon, Yorktown Heights, NY (US); Peter K. Malkin, Yorktown Heights, NY (US); Marc P. Yvon, Antony (FR)

(73) Assignee: International Business Machines Corporation, Armonk, NY (US)

( * ) Notice: Subject to any disclaimer, the term of this patent is extended or adjusted under 35 U.S.C. 154(b) by 108 days.

This patent is subject to a terminal disclaimer.

(21) Appl. No.: 13/970,061

(22) Filed: Aug. 19, 2013

(65) Prior Publication Data

US 2014/0372598 A1    Dec. 18, 2014

Related U.S. Application Data

(63) Continuation of application No. 13/920,561, filed on Jun. 18, 2013.

(51) Int. Cl.
*G06F 15/16* (2006.01)
*H04L 12/24* (2006.01)
*H04W 52/02* (2009.01)

(52) U.S. Cl.
CPC ......... *H04L 41/0833* (2013.01); *H04W 52/028* (2013.01); *H04W 52/0261* (2013.01)

(58) Field of Classification Search
CPC ......... H04L 12/24; H04L 12/26; H04L 41/00; H04L 43/04; H04L 67/2861; G06F 17/30575; G06F 15/16
USPC ................... 709/201, 224, 225; 455/411, 420
See application file for complete search history.

(56) References Cited

U.S. PATENT DOCUMENTS 8,032,625 B2    10/2011    Benfield et al.
8,195,737 B2 *    6/2012    Kato ................. G06F 9/505
                                                              709/201

(Continued)

OTHER PUBLICATIONS

Rollins et al, "Power-Aware Data Management for Small Devices," WoWMoM'02, Sep. 28, 2002, Atlanta, Georgia, USA, pp. 80-87.

(Continued)

*Primary Examiner* — Tesfay Yohannes
(74) *Attorney, Agent, or Firm* — Scully, Scott, Murphy & Presser, P.C.; David Quinn, Esq.

(57) ABSTRACT

Managing devices in a system may comprise receiving information associated with a first device in the system and a first set of capabilities provided in the first device; receiving information associated with a second device in the system and a second set of capabilities provided in the second device; determining one or more required capabilities that need to be activated for the system, the system comprising at least the first device and the second device; for each of the one or more required capabilities, selecting automatically by a processor based on the information received and one or more criteria, which capability in the first device and the second device to activate to satisfy the one or more required capabilities; and activating said selected capability in the first device or the second device.

19 Claims, 6 Drawing Sheets

(56) References Cited

U.S. PATENT DOCUMENTS

| | | | |
|---|---|---|---|
| 8,205,000 B2 | 6/2012 | Chang et al. | |
| 8,639,236 B2* | 1/2014 | Truskovsky | H04M 1/72577 455/414.2 |
| 2003/0027608 A1 | 2/2003 | Carmeli et al. | |
| 2003/0196127 A1 | 10/2003 | Olsen | |
| 2004/0030771 A1* | 2/2004 | Strassner | H04L 41/0863 709/224 |
| 2005/0143865 A1* | 6/2005 | Gardner | H02J 3/14 700/291 |
| 2010/0065979 A1* | 3/2010 | Betsche | B29C 45/76 264/40.6 |
| 2010/0076615 A1* | 3/2010 | Daniel | F03D 9/00 700/293 |
| 2012/0002733 A1 | 1/2012 | Misra et al. | |
| 2012/0072594 A1* | 3/2012 | George | H04L 41/00 709/225 |
| 2012/0143820 A1 | 6/2012 | Celi, Jr. et al. | |
| 2012/0282974 A1* | 11/2012 | Green | G08B 13/19689 455/550.1 |
| 2013/0091442 A1* | 4/2013 | Diab | G06Q 30/00 715/753 |
| 2013/0102282 A1* | 4/2013 | Cutts | G06F 21/10 455/411 |
| 2013/0260733 A1* | 10/2013 | Lidin | H04W 8/24 455/418 |
| 2014/0376405 A1* | 12/2014 | Erickson et al. | 370/254 |

OTHER PUBLICATIONS

Pfeifer, "Synergetic Positioning Architecture for Location-dependent Services," Proceedings of the 29th Annual IEEE International Conference on Local Computer Networks (LCN'04), Nov. 16-18, 2004, pp. 404-406.

Hsia et al., "Passive RFID Transponder with Power-Aware Encryption," Circuits and Systems, 2008. MWSCAS 2008 51st Midwest Symposium, Aug. 10-13, 2008, pp. 838-841.

Henrici et al., "Bridging the gap between pervasive devices and global networks." Collaborative Technologies and Systems, 2008. CTS 2008. International Symposium on. IEEE, May 19-23, 2008, pp. 1-8.

Briscoe, "The Implications of Pervasive Computing on Network Design," BT Technology Journal, Nov. 20, 2004, pp. 1-26, Springer.

\* cited by examiner

OPTIMIZING RESOURCE USAGE IN SYSTEMS WHICH INCLUDE HETEROGENEOUS DEVICES, INCLUDING SENSORS AND SMARTPHONES

CROSS-REFERENCE TO RELATED APPLICATIONS

This application is a continuation of U.S. Ser. No. 13/920,561, filed on Jun. 18, 2013, the entire content and disclosure of which is incorporated herein by reference.

FIELD

The present application relates generally to computers, and computer applications, and more particularly to pervasive devices.

BACKGROUND

In many cases, when developing a system solution by assembling and integrating a number of devices or sub-systems the overall system will end up containing devices with a number of unused and/or redundant features and capabilities. For example, a system may include a smartphone along with multiple sensors. It is possible that all of the devices include global positioning system (GPS) capability even though only a single GPS unit is necessary for the entire system.

BRIEF SUMMARY

A method for managing devices in a system, in one aspect, may comprise receiving information associated with a first device in the system and a first set of capabilities provided in the first device. The method may also comprise receiving information associated with a second device in the system and a second set of capabilities provided in the second device. The method may further comprise determining one or more required capabilities that need to be activated for the system, the system comprising at least the first device and the second device. The method may also comprise selecting automatically by a processor based on the information received and one or more criteria, which capability in the first device and the second device to activate to satisfy the one or more required capabilities; and activating said selected capability in the first device or the second device.

A system for managing devices, in one aspect, may comprise a first device comprising a first set of capabilities. A second device comprises a second set of capabilities, the first and the second devices being independent devices from one another. A module may be operable to execute on a processor and further operable to receive information associated with the first device and the first set of capabilities provided in the first device. The module may be further operable to receive information associated with the second device and the second set of capabilities provided in the second device, the module further operable to determine one or more required capabilities that need to be activated for the system. The module may be further operable to select based on the information received and one or more criteria, which capability in the first device and the second device to activate to satisfy the one or more required capabilities. The module may be further operable to activate said selected capability in the first device or the second device.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

The present disclosure in one embodiment provides a methodology, a middleware component and/or software that controls which features on which devices are used based on a defined strategy such as energy savings or performance.

Given mobile solutions are built by assembling and integrating several sub-systems. For instance a mobile Geiger counter might contain a global positioning system (GPS) chip, sensor for making radiation measurements, a memory device for storing the measured radiation levels, a display unit for showing radiation levels in real-time, and a Bluetooth communication chip for wireless communications. The Geiger counter subsystem may also include battery and Wi-Fi (or like wireless communication) capability. An application generated may be made of individual parts or sub-systems integrated together, for instance, with multiple sensors, smartphone, and central processing unit, and so forth. The solution may be extended according to the specification with more and more sub-systems. For example, a smartphone with GPS, Wi-Fi and Bluetooth (or like short distance wireless communication technology) capabilities and battery may be considered another sub-system in the overall integrated system. Another sub-system could be a server which communicates with a plurality of Geiger counters, distributed within a city or in the country-side to interrogate readings from several independent Geiger counters. Pragmatically these parts have embedded capabilities such as GPS, wireless communication capabilities such as Bluetooth communication, Wi-Fi communication, and/or others. Those capabilities may work independently from one another, and may be activated or not activated. At time, these capabilities may be activated at the same time in different places and run redundantly, without being able to be controlled. In one embodiment of the present disclosure, a mechanism to control the activation and deactivation of those capabilities may be provided. Such mechanism may provide for savings of energy expanded in operating those features redundantly. For instance, redundantly activated or enabled capabilities may unnecessarily consume the energy and may as a consequence affect the overall system.

As these sub-systems may have been meant to be operated alone as independent devices, they may incorporate a set of capabilities that drain down the power source, for instance, if one does not pay attention to turn it off when not needed. The mechanism of the present disclosure may manage turning ON and OFF of those features automatically, while leaving some still ON to still support a service (GPS, for instance).

While assembling sub-systems (parts), one faces a challenge of deciding what features to keep ON and balancing activities according to remaining power. In one aspect, the mechanism of the present disclosure may manage and optimize the power or energy usage in a system made of a plurality of sub-systems, initially as well as during an on-going use of the system.

For example, the balancing of redundant capabilities in a system made up of, or comprising, sub-systems may be optimized. Sub-systems are also referred to as devices in the present disclosure. These sub-systems are taken out-of-the-box with their built-in functionality. In one exemplary example, a smart phone may communicate wirelessly via Bluetooth with a mobile Geiger counter. Both devices might contain GPS devices out-of-the box, since each could operate autonomously. These sub-systems are meant to not depend on other sub-systems.

As a result of assembling those sub-systems (devices) into an overall system, some capabilities may become redundant or duplicated.

Figure 1:
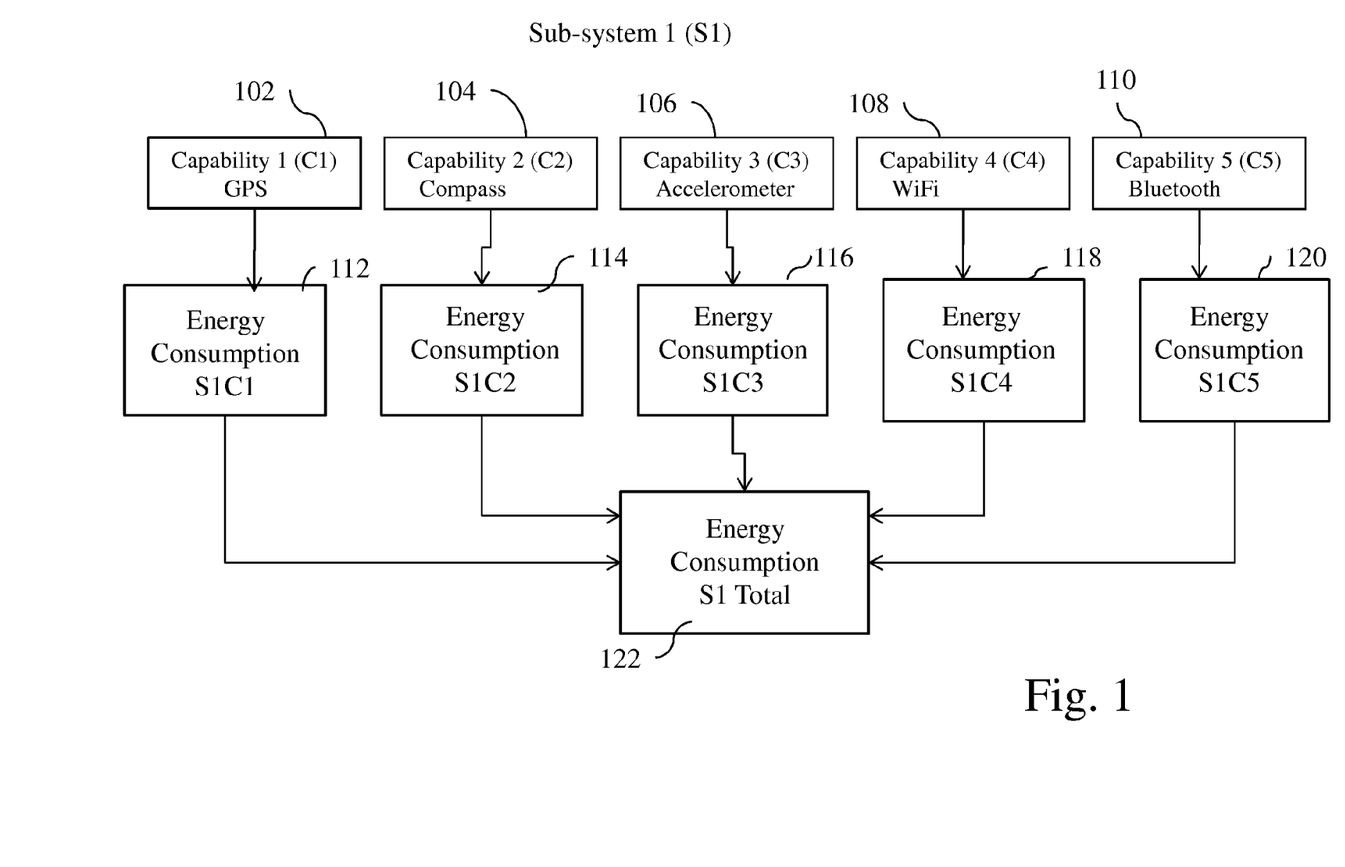
FIG. 1 is a diagram illustrating an example sub-system with multiple capabilities.

As an example, consider a target system (referred to as System A, for example) comprising two or more subsystems, for example, sub-system 1, sub-system 2, . . . , sub-system N. Consider that an example of the sub-system 1 is a smartphone, for example, used for its central processing unit (CPU), random access memory (RAM), and communication capabilities. FIG. 1 is a diagram illustrating an example sub-system with multiple capabilities. This example sub-system may be a smartphone. This sub-system may have the following capabilities: GPS 102 (Capability 1), Compass 104 (capability 2), Accelerometer 106 (Capability 3), Wi-Fi 108 (Capability 4), Bluetooth 110 (Capability 5). The total energy consumption EC of the target system (system A), may comprise the aggregation of energy consumption of individual capabilities in each of the sub-system making up the target system (system A). Referring to FIG. 1, GPS 102 has associated energy consumption (S1C1) 112, Compass 104 has associated energy consumption (S1C2) 114, Accelerometer 106 has associated energy consumption (S1C3) 116, Wi-Fi 108 has associated energy consumption (S1C4) 118, and Bluetooth 110 has associated energy consumption (S1C5) 120. The total energy consumption (EC1) of sub-system 1 (S1) 122 is the aggregation of each individual energy consumption (112, 114, 116, 118, 120).

Figure 2:
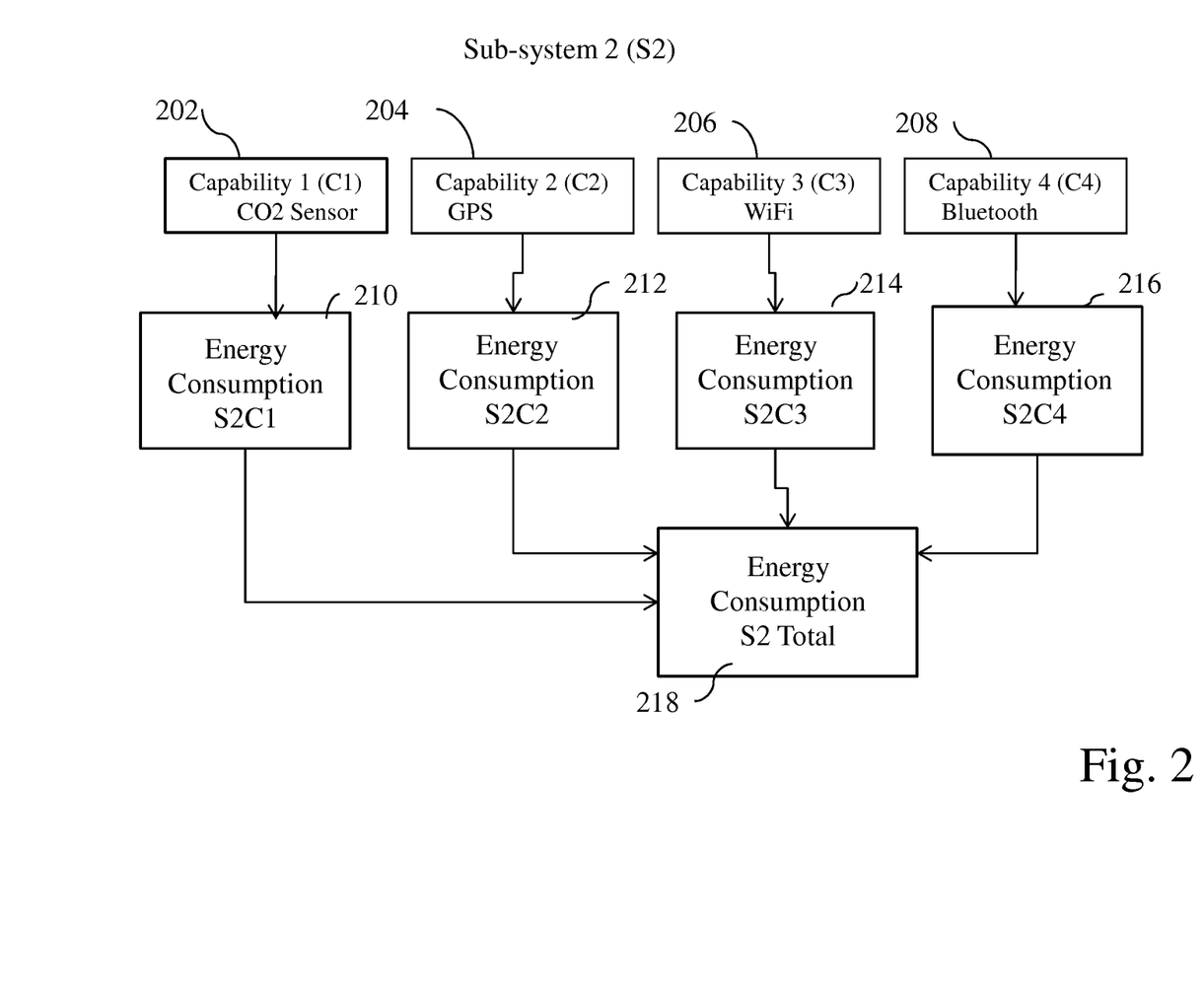
FIG. 2 is a diagram illustrating another example sub-system with multiple capabilities.

FIG. 2 is a diagram illustrating another example sub-system with multiple capabilities. For example, the target system may also include sub-system 2 illustrated in FIG. 2. An example of sub-system 2 may be a carbon dioxide (CO2) sensor. This sub-system may have the following capabilities: CO2 sensing 202 (Capability 1), GPS 204 (capability 2), Wi-Fi 206 (Capability 3), Bluetooth 208 (Capability 4). CO2 sensing 202 has associated energy consumption (S2C1) 210, GPS 204 has associated energy consumption (S2C2) 212, Wi-Fi 206 has associated energy consumption (S2C3) 214, and Bluetooth 208 has associated energy consumption (S2C4) 216. The total energy consumption (EC2) of sub-system 1 (S2) 218 is the aggregation of each individual energy consumption (210, 212, 214, 216).

Yet another example of a sub-system may be a carbon monoxide (CO) sensor. Such CO sensor may comprise capabilities such as CO sensing, GPS, Bluetooth, and Accelerometer capabilities. Each of these capabilities has associated energy consumption level or amount.

The mechanism of the present disclosure provides for controlling which one or more of those capabilities in the sub-systems at any given point in time should be kept ON or OFF, for example, in order to save total energy consumption in the overall system.

The mechanism of the present disclosure in one embodiment may manage a list of all available features or capabilities in all the sub-systems (sub-system 1 to N) making up the overall system. A list of necessary features by an application (e.g., 1 GPS, 1 CO, 1 CO2, 1 Wi-Fi and 1 Accelerometer) may be also managed. A list of eligible features for controlling may be also generated. The energy status associated with all sub-systems (EC 1, EC 2, . . . , EC N) may be updated. Based on the list of eligible features and associated energy status, whether to turn those features ON or OFF may be determined.

Power (e.g., in Watts) is the product of the current draw of the items in a circuit (in Amps) multiplied by the voltage (in Volts). Many devices use the battery voltage directly. Batteries are rated in amp-hours. For instance an external battery pack for a smartphone might have a capacity of 8400 mA-hours (milliamp-hours) or 8.4 Amp-hours. That means that if the device draws 0.5 A, the battery will be depleted roughly after 16.8 hours. If the device draws 1 A, then the battery will only last 8.4 hours. The higher the current draw, the higher the power and the shorter the battery life.

Monitoring the power usage in a sub-system may be performed by monitoring the electrical current using an ammeter, for fixed voltage. The current draw may be measured by placing the ammeter in series with a battery terminal. The measurement (the magnitude of the current) may be "read" onboard. The measurement also may be sent wirelessly to an external computer or another device. The current draw (or power) from a single component may be determined by placing the ammeter in series with the power cable supplying power to each component. The current draw from a single component also may be determined by measuring the change in total power (at the battery) when a component is turned off or on. The power levels of components might not be constant. For instance, the GPS might draw a low value of current if it is not being asked to supply a latitude/longitude data, for instance, to an on-board device or a remote computer.

Each sub-system (for example, shown in FIG. 1 and FIG. 2) may be modified to allow for determining the current or power level of each component as described above. Each sub-system may be also provided with a switch to turn the individual component off or on.

Figure 5:
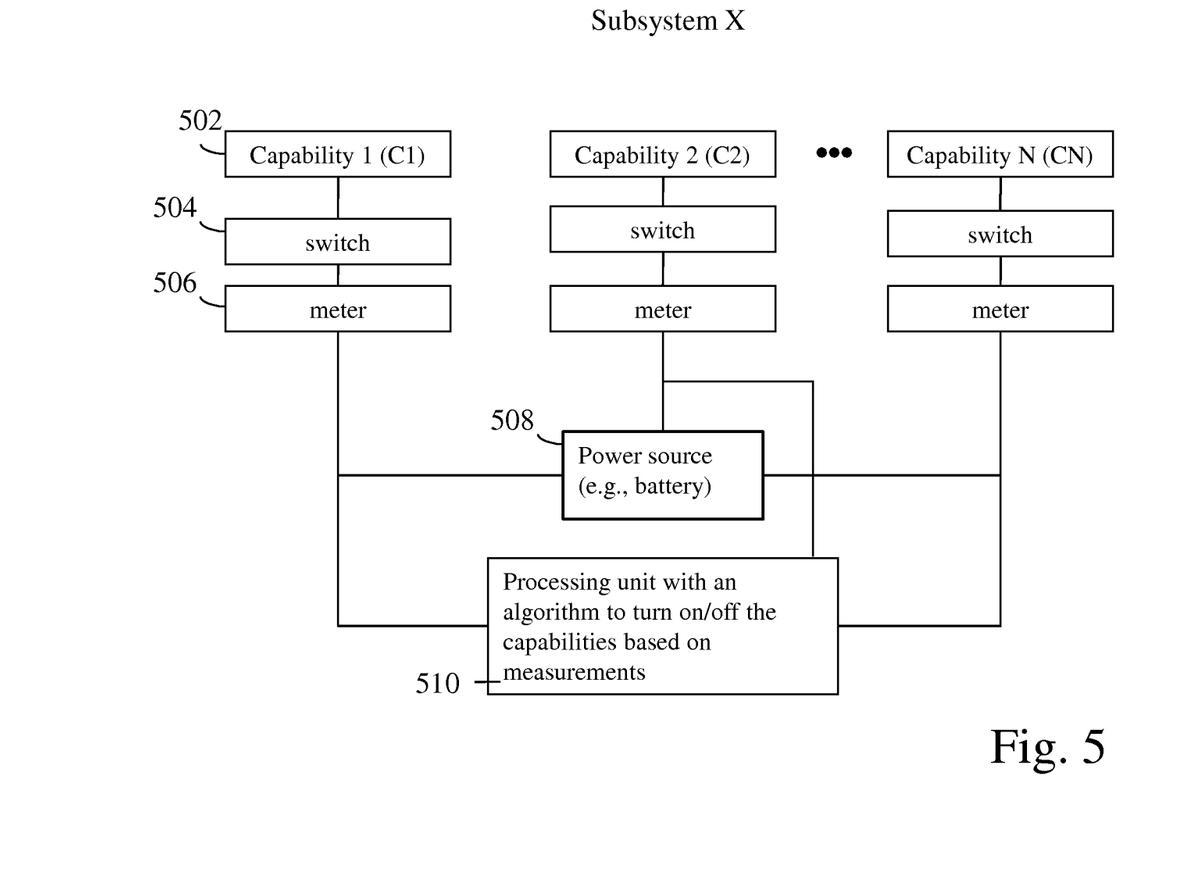
FIG. 5 is a schematic diagram illustrating an example of a sub-system.

FIG. 5 is a schematic diagram illustrating an example of a sub-system that comprises a plurality of components each attached to a power consumption measurement device, e.g., ammeter as described above. A power source 508 may provide power to the components (shown as capabilities). A capability 502 may be connected to a meter 506 (e.g., ammeter) that can measure its power consumption. The capability 502 may be turned ON or OFF with a switch 504, for example, by a processing unit 510 that executes an algorithm that turns ON and OFF the components as described herein. The processing unit 510 may receive instructions from a remote application or execute an intelligent algorithm locally for turning the components ON and OFF based on the measurements and/or measurements obtained from another sub-system. It is contemplated that the sub-system would have additional components and/or functionalities not shown in the figure for allowing proper functioning of the sub-system.

The power consumed by the components in the sub-systems may be monitored and one or more of the components switched ON and OFF dynamically. For example, consider an example of a Geiger counter and smartphone as two sub-systems in an overall system. Both have GPS components, and assuming that both GPSs are in proximity of each other in the overall system, the two GPSs would provide nearly identical location data. If one of the components is running low on power (e.g., because the smartphone is connected to Wi-Fi and is being used widely for phoning and texting), an on-board sensor may determine that the battery level is low on the smartphone, and dynamically shut down the smartphone's GPS to preserves its battery.

The power consumed by each similar component in the subsystems may be measured, and used in different ways. For example, an algorithm may be provided that can predict the energy savings when a redundant device is shut down. For instance, the amount of energy saved by turning off a component would be approximate to the measured power consumed by that individual component. In addition, which component or sub-system has lower energy consumption may be detected by using the individual component's power consumption.

Yet in another aspect, power consumption of a component may be controlled. For instance, the polling of the GPS device for location information may be controlled (e.g., the polling may be controlled to occur less frequently) to preserve battery power, for instance, if the available power level is running low. In another aspect, if the location were relatively constant, then the polling frequency could be reduced which would also save the battery.

An algorithm for determining which capability or feature, on which subsystem to turn ON or OFF may be as follows. Consider a Request Ri as the capabilities needed by the overall system i. Ri (GPS, Wi-Fi) notation represents a requirement of system i to have the GPS and Wi-Fi capabilities to be activated (turned ON).

Let's say Ri (GPS, Wi-Fi) represents a requirement for having ON (activated) the GPS and Wi-Fi capabilities in a system. A constraint in the algorithm may include making sure that for the same capacity (referred to as Cx), e.g., GPS or Wi-Fi, there is only one energy consumption (EC S (1 . . . N)) being expanded, i.e., only one of the same capacity is turned ON at any given point in time.

For example, given Ri (GPS, Wi-Fi), the algorithm activates only one GPS out of all GPS capabilities in sub-systems 1 . . . N at a given time. Referring to the example system comprising sub-systems of FIG. 1 and FIG. 2, one GPS capability would be activated out of GPS 102 and GPS 204. Similarly, only one Wi-Fi would be activated out of Wi-Fi 208 and Wi-Fi 206.

The management of the capability (function or feature) activation on different sub-systems may be based on one or more strategy or criterion. Further, in one embodiment of the present disclosure, after a certain time, sub-system activation may be switched to another of the same capabilities. For example, if a GPS function was delivered by sub-system 1 (FIG. 1 102), after a time period (e.g., based on a criterion), GPS capability at sub-system 1 (FIG. 1 102) may be turned OFF, and the same capability, GPS function at sub-system 2 (FIG. 2 204) may be turned ON. Alternating the activation of the same capability provided in different sub-systems avoids having to always have the same device ON.

The algorithm in one embodiment also dispatches energy consumption across sub-systems when the same capabilities are available in different sub-systems. Referring to the above example of Ri (GPS, Wi-Fi), the algorithm may activate one capability (e.g., GPS 102 in FIG. 1 or GPS 204 in FIG. 1) in one sub-system, while the other capability (e.g., Wi-Fi 206 in FIG. 2 or Wi-Fi 108 in FIG. 1) may be activated in another sub-system. Thus, the algorithm would avoid having both the GPS and Wi-Fi turned ON in on sub-system. In this way, not all required capabilities are run in one sub-system, and energy consumption may be dispatched across of all sub-systems.

The mechanism of the present disclosure may also include monitoring and evaluating over time the differences of energy consumption (EC) for same capability (Cx) by different sub-systems. The mechanism may activate as much as possible the SyCx combination consuming the least energy.

In addition, consideration may be taken into account that while new capabilities are integrated in the overall system, it is likely their associated technologies would be more efficient than old ones, and therefore more optimized. The mechanism of the present disclosure in one embodiment may over time activate the most efficient (e.g., best performance for saving energy) combination of sub-system capabilities.

In another aspect, the mechanism of the present disclosure may reactivate capabilities of a given sub-system (device) if its energy source increases its charge status. For instance, consider a device that is powered with solar cells. In determining whether to activate a capability from such a sub-system, overall energy use of that sub-system during the night time or cloudy periods when or where there less capacity for recharging the sub-system, may be taken into consideration. Similarly, use in sunlight or in the presence of battery power that was stored during a previous sunny period, may be taken into consideration. Likewise, consideration is taken into account of a sub-system that has or is prone to faster drainage of batteries or the like. Still yet, the mechanism of the present disclosure may consider the energy consumption evolution for the same capability by different sub-systems.

In one aspect, a remote application may be utilized to turn the components ON or OFF remotely. In another aspect, the components may be turned ON or OFF locally by an on-board application or the like.

Figure 3:
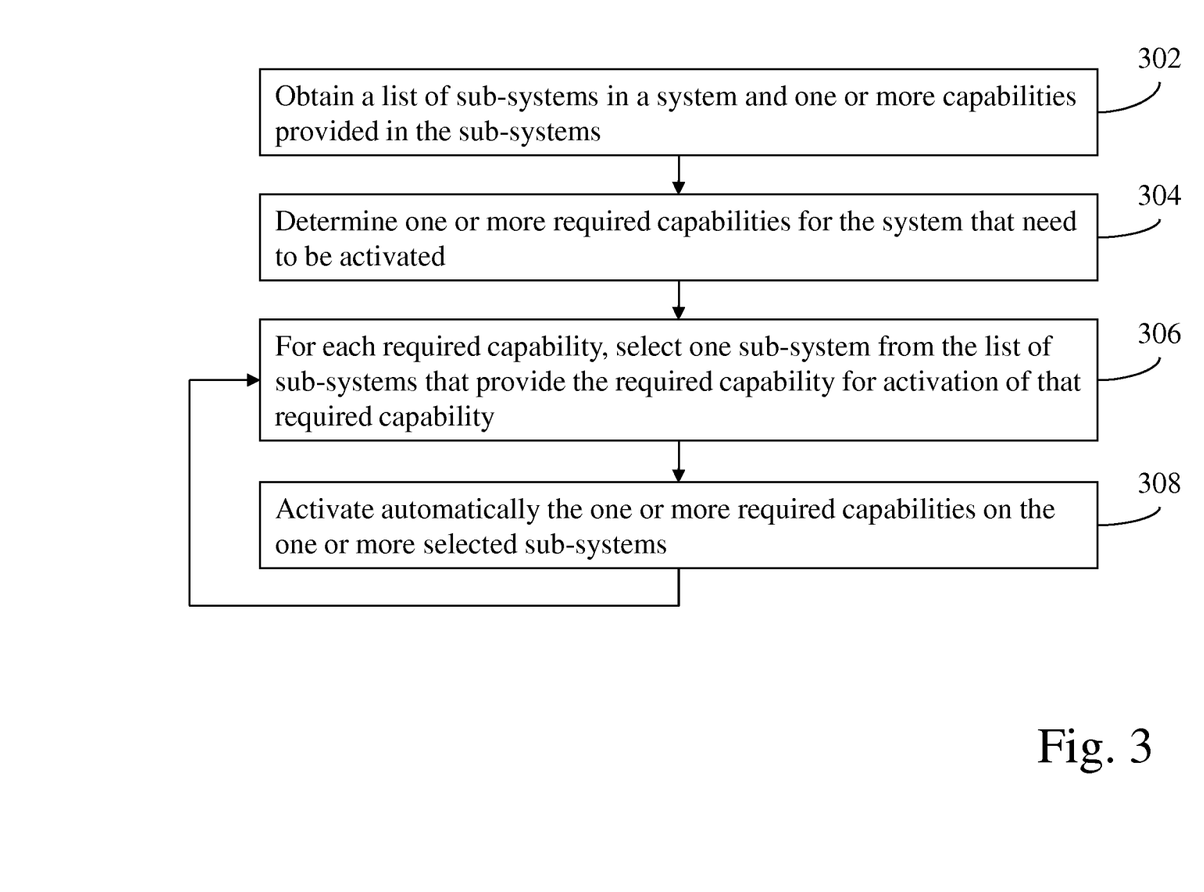
FIG. 3 is a flow diagram illustrating a method for enabling one or more system capabilities in a system having a plurality of sub-systems in one embodiment of the present disclosure.

FIG. 3 is a flow diagram illustrating a method for enabling one or more system capabilities in a system having a plurality of sub-systems in one embodiment of the present disclosure. The sub-systems are distinct devices, for instance, to be run independently without depending on another device in the system. For example, the system may include a first device (sub-system) comprising a first set of capabilities, a second device (sub-system) comprising a second set of capabilities. The sub-systems have at least one overlapping capability. At 302, the method may comprise obtaining a list of sub-systems in the system and one or more capabilities provided in the sub-systems. For instance, the method may comprise receiving information associated with the first device and the first set of capabilities, and information associated with the second device and the second set of capabilities may be received. At 304, one or more required capabilities for the system that need to be activated is determined or obtained. The required capabilities may be obtained from a user. In another aspect, the required capabilities may be automatically determined, for example, based on the functionalities and purposes of each of the sub-systems in the system, and/or other considerations.

At 306, for each required capability, one sub-system from the list of sub-systems that provides the required capability is selected for activation of that capability. For instance, based on the information received and one or more criteria, the method may automatically select which capability from the first device and the second device to activate to satisfy the one or more required capabilities of the system. For example, as discussed above, a sub-system (or device) that provides the capability with the least energy usage in providing that capability, as well as currently having the least total energy usage may be selected. Other criteria may include one or more of minimizing total energy use in each of the sub-systems, minimizing total energy use in the system, distributing activation of said each of the one or more required capabilities across said sub-systems, for instance, in a balanced manner, so that not all of the required capabilities are activated on one sub-system. Other considerations may be taken into account when selecting a sub-system (device) on which to run (activate) the required capability.

At 308, the one or more required capabilities may then be automatically activated on the one or more selected sub-systems. For instance, the selected capability is activated in the first device or the second device. In another aspect, the same capability present in the sub-systems not selected (hence redundant), may be automatically deactivated on those not-selected subsystems, if not already deactivated. In another aspect, before automatically activating the capability in the selected sub-system, a user may be asked to confirm the activation. Examples of capabilities may include, but are not limited to, location-aware $CO_2$ sensor, navigation system, radiation sensor, magnetic field sensor, and noise (dB) sensor.

As described above, the activation of the capabilities in different sub-systems may change over time automatically, for example, based on continuous or periodic monitoring and evaluating. For example, the energy usage in the one or more sub-systems may be checked to determine whether a required capability should be activated on a different sub-system, for example, based on the current energy usage of the selected sub-system. For instance, if the sub-system having the required capability activated currently is being drained of power (e.g., as determined by a threshold value), the mechanism of the present disclosure may re-evaluate another sub-system that provide the same capability, and may decide to activate the capability on that another sub-system rather than the current one. Thus, for example, the method may return to 306 to re-determine which of the capabilities should be run on which of the sub-systems.

Yet in another aspect, the list of subsystems in the system may change, for example, as the system may be integrated with more subsystems. In addition, the one or more required capabilities for the system may also change. The method in one embodiment utilizes the updated list of subsystems and the required capabilities in performing its functions at 306 and 308.

Figure 6:
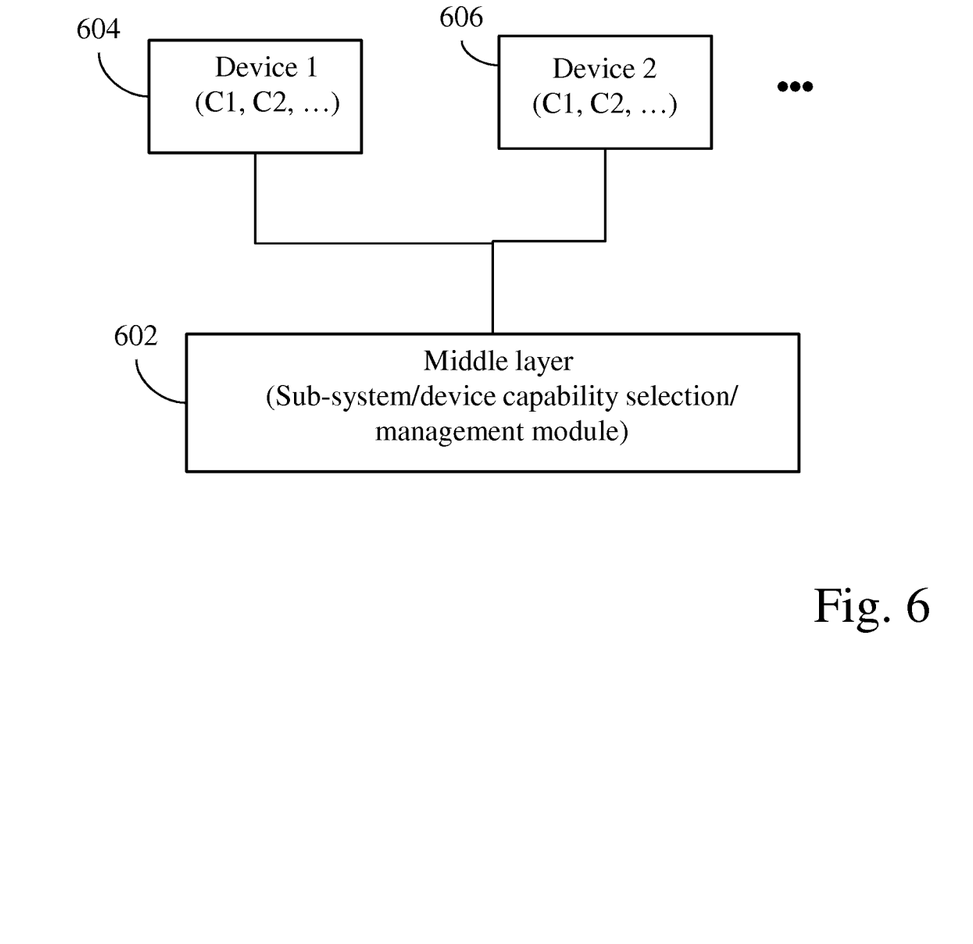
FIG. 6 is a block diagram illustrating an overall target system comprising a plurality of independent devices.

FIG. 6 is a high-level block diagram illustrating an overall target system of the present disclosure in one embodiment. The overall system may comprise two or more devices, e.g., referred to also as sub-systems (e.g., 604, 606). Each of the devices may comprise a plurality of capabilities, e.g., as shown and described with reference to FIGS. 1 and 2 above. Each of the devices has its own built-in functionality and functions on its own, for example, without any dependence on other devices. For instance, devices are built to be distinct and are not intended (at least initially when built) to operate in coordination with another device. In one embodiment of the present disclosure, such plurality of devices is managed by a middle layer (e.g., software application) 602 or the like, so as to optimize the usage and power consumption of the capabilities in the devices making up the overall target system. The middle layer 602 of the present disclosure in one embodiment coordinates and/or control the workings (e.g., which capabilities are activated or not activated) of those devices. In one aspect, the middle layer 602 of the present disclosure acts as an operating system between two or more distinct devices, to monitor components' power consumptions and shut selective components off, based on the monitoring and/or one or more other criteria or algorithms, for example, dynamically, for example, as described above. In one embodiment of the present disclosure, more devices may be adaptively and/or dynamically added into the overall target system for the middle layer 602 to manage. The middle layer 602 may receive information associated with the capabilities of each of the devices (e.g., 604, 606), and which capabilities are required in the overall target system. The power consumption associated each of the capabilities in each of the devices may be measured and monitored. Based on at least the information and the monitored power consumption, the middle layer 602 may select which components on which devices can be shut off, and still yet have the overall system provide the required capabilities (or functionalities) by the devices. In one embodiment of the present disclosure, the monitoring of power consumption may be performed on an on-going basis, e.g., continuously or continually (periodically), and the selecting which of the components (capabilities) to turn ON or OFF, may be performed dynamically based on the current status of the power consumption (e.g., in each of the devices) and/or other criterion in the overall target system. The middle layer 602 may communicate with the devices 604, 606 using wireless and/or wired communication methods. Hence, the middle layer 602 may be located remotely from the devices making up the overall target system. In another embodiment, the middle layer 602 may reside with the devices making up the overall target system.

Figure 4:
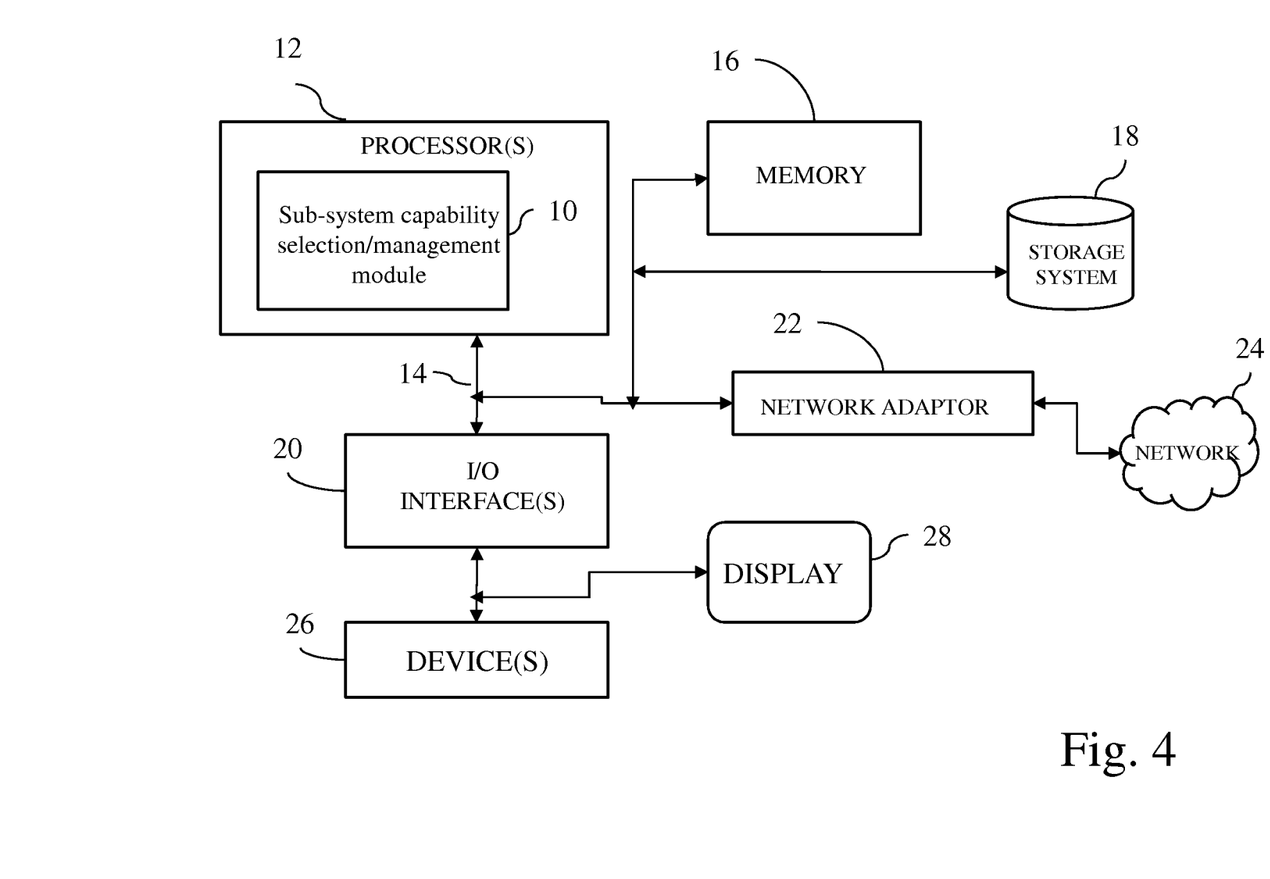
FIG. 4 illustrates a schematic of an example computer or processing system that may implement a resource usage optimizing system in one embodiment of the present disclosure.

FIG. 4 illustrates a schematic of an example computer or processing system that may implement a system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a sub-system capability selection module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A non-transitory computer readable storage medium storing a program of instructions executable by a machine to perform a method of devices in a system, the method comprising:

receiving information associated with a first device in the system and a first set of capabilities provided in the first device;

receiving information associated with a second device in the system and a second set of capabilities provided in the second device;

determining one or more required capabilities that need to be activated for the system, the system comprising at least the first device and the second device;

for each of the one or more required capabilities, selecting automatically by a processor based on an information received and one or more criteria, which capability in the first device and the second device to activate to satisfy the one or more required capabilities; and activating said selected capability in the first device or the second device, wherein at least one capability in the first set of capabilities is a same capability provided in the second set of capabilities, and wherein responsive to said at least one capability in the first set of capabilities being selected to activate, the same capability in the second set of capabilities is selected to deactivate, and wherein the one or more criteria comprises distributing activation of said each of the required capabilities across the first device and the second device.

2. The non-transitory computer readable storage medium of claim 1, wherein the one or more criteria comprises minimizing total energy use in the first device and the second device.

3. The non-transitory computer readable storage medium of claim 1, wherein the one or more criteria comprises minimizing total energy use in the system.

4. The non-transitory computer readable storage medium of claim 1, further comprising:
monitoring energy use in the first device and the second device and repeating the selecting and the activating over time during operation of the system.

5. The non-transitory computer readable storage medium of claim 1, wherein the activating is performed automatically by the processor.

6. The non-transitory computer readable storage medium of claim 1, wherein the activating is performed automatically by the processor after receiving a user confirmation to activate.

7. The non-transitory computer readable storage medium of claim 1, further comprising deactivating said each of the one or more required capabilities present in the first device and the second device that is not-selected.

8. A system for managing distinct devices, comprising:
a processor;
a first device comprising a first set of capabilities;
a second device comprising a second set of capabilities, the first and the second devices being independent devices from one another; and
a module operable to execute on the processor and further operable to receive information associated with the first device and the first set of capabilities provided in the first device, the module further operable to receive information associated with the second device and the second set of capabilities provided in the second device, the module further operable to determine one or more required capabilities that need to be activated for the system, the module further operable to select based on an information received and one or more criteria, which capability in the first device and the second device to activate to satisfy the one or more required capabilities, the module further operable to activate said selected capability in the first device or the second device,
wherein at least one capability in the first set of capabilities is a same capability provided in the second set of capabilities, and wherein responsive to the module selecting said at least one capability in the first set of capabilities to activate, the module is operable to select the same capability in the second set of capabilities to deactivate,
wherein the one or more criteria comprises distributing activation of said each of the required capabilities across the first device and the second device.

9. The system of claim 8, wherein the one or more criteria comprises:
minimizing total energy use in each of the first device and the second device; or
minimizing total energy use in the system; or
combinations thereof.

10. The system of claim 8, wherein the module is further operable to monitor energy use in the first device and the second device and repeat periodically the selecting and the activating over time during operation of the system.

11. The system of claim 8, wherein the first set of capabilities comprises at least a combination of two or more of wireless communication, short-range wireless communication, radiation sensor, global positioning system receiver, compass, accelerator, carbon dioxide sensing capability, or carbon monoxide sensing capability.

12. The system of claim 8, wherein the second set of capabilities comprises at least a combination of two or more of wireless communication, short-range wireless communication, radiation sensor, global positioning system receiver, compass, accelerator, carbon dioxide sensing capability, or carbon monoxide sensing capability.

13. The system of claim 8, wherein the first device and the second device are devices built to operate independently from one another, the first device and the second device assembled into the system.

14. The system of claim 8, wherein the first device comprises a Geiger counter, smartphone, carbon monoxide sensor or carbon dioxide sensor,
and the second device comprises a Geiger counter, smartphone, carbon monoxide sensor or carbon dioxide sensor.

15. The non-transitory computer readable storage medium of claim 1, wherein the first set of capabilities comprises at least a combination of two or more of wireless communication, short-range wireless communication, radiation sensor, global positioning system receiver, compass, accelerator, carbon dioxide sensing capability, or carbon monoxide sensing capability.

16. The non-transitory computer readable storage medium of claim 1, wherein the second set of capabilities comprises at least a combination of two or more of wireless communication, short-range wireless communication, radiation sensor, global positioning system receiver, compass, accelerator, carbon dioxide sensing capability, or carbon monoxide sensing capability.

17. The non-transitory computer readable storage medium of claim 1, wherein the first device and the second device are devices built to operate independently from one another, the first device and the second device assembled into the system.

18. The non-transitory computer readable storage medium of claim 1, wherein the first device comprises a Geiger counter, smartphone, carbon monoxide sensor or carbon dioxide sensor,
and the second device comprises a Geiger counter, smartphone, carbon monoxide sensor or carbon dioxide sensor.

19. The non-transitory computer readable storage medium of claim 1, wherein the first device and the second device are operable autonomously without depending on one another at least prior to being assembled into the system.

* * * * *